(12) United States Patent
Forlander

(10) Patent No.: US 6,231,052 B1
(45) Date of Patent: May 15, 2001

(54) TRANSPARENT FLANGE PROTECTOR

(76) Inventor: W. Thomas Forlander, P.O. Box 60399, Lafayette, LA (US) 70596-0399

( * ) Notice: Subject to any disclaimer, the term of this patent is extended or adjusted under 35 U.S.C. 154(b) by 0 days.

(21) Appl. No.: 09/426,999

(22) Filed: Oct. 26, 1999

(51) Int. Cl.[7] .................................................. F16L 17/00
(52) U.S. Cl. ............................ 277/616; 285/45; 285/336
(58) Field of Search .................................. 277/608, 615, 277/616, 620, 317; 285/336, 45

(56) References Cited

U.S. PATENT DOCUMENTS

| | | | |
|---|---|---|---|
| 3,834,744 | * | 9/1974 | Masatchi ........................... 277/608 X |
| 4,457,517 | * | 7/1984 | Dunegan .............................. 277/608 |
| 4,927,182 | * | 5/1990 | Moore .................................. 277/616 |
| 5,222,769 | * | 6/1993 | Kaempen .............................. 285/45 |
| 5,609,369 | * | 3/1997 | Wilder et al. ..................... 277/608 X |

* cited by examiner

Primary Examiner—Anthony Knight
Assistant Examiner—Karlena D. Schwing
(74) Attorney, Agent, or Firm—William W. Stagg

(57) ABSTRACT

A flange protector for protecting opposing flanges of a pipe joint from corrosion and leakage. The flange protector is comprised of a transparent, flexible, elastomeric band for wrapping around the periphery of the opposing pipe flanges of the pipe joint. The band has metal straps that support a fastener for pulling the ends of the band together tightly around the pipe flanges and lubrication inserts for injecting a lubricant through the transparent band to the surfaces of the flanges. The transparent band is sufficiently clear so as to allow visualization of the amount of the lubricant present at the flanged pipe joint and the presence of any corrosion of the flange surfaces without the removal of the flange protector from the flanged pipe joint.

17 Claims, 2 Drawing Sheets

TRANSPARENT FLANGE PROTECTOR

FIELD OF THE INVENTION

This invention relates to pipe flange protectors, and more particularly to a lightweight, weather resistant, transparent flange protector for protecting the flange and interior flange surfaces from the moisture and corrosion that is inherent in a pipeline environment.

BACKGROUND OF THE INVENTION

Pipelines are typically constructed by employing sections of pipe joined together by opposing metal pipe flanges. These opposing pipe flanges should be properly sealed in order to prevent air and moisture from entering onto the interior surfaces of the flanges and causing pifting and corrosion that often results in a loss of pipeline integrity and an increased need for costly inspection and repair. Means for sealing the pipe flanges typically involve the use of pipe flange protectors that employ bands or rings that cover the outer edge of the opposing flanges. Many of these flange protectors have valve means for injecting lubricants and corrosion inhibitors under the flange protector.

An example of one such flange protector is that disclosed in U.S. Pat. No. 4,457,517 to Dunegan. This patent discloses the use of an elastomer ring secured around the opposing flange surfaces by a continuous metal band. The elastomer ring has grease fittings for injecting lubricants into the area covered by the elastomer ring. One problem associated with a flange protector such as that disclosed by Dunegan arises during the inspection of the flange after the flange protector has been installed. The continuous metal band and elastomer ring cover the outer surface of the flange so that the lubricated flange surface cannot be visualized. Consequently, a visual inspection of the flange and flange protector will not reveal whether a sufficient quantity of lubricant has been injected into the flange protector or whether corrosion.

SUMMARY OF THE INVENTION

It is thus an object of the invention to provide a flange protector for attachment to a flange of a pipe or conduit that will allow a visual inspection of the outer surfaces of the opposing flanges without removing the flange protector.

Another object is to provide a flange protector that will allow an installer and an inspector to visualize the amount of lubricant injected into the protector.

To achieve these and other objects and advantages, the flange protector of the present invention is comprised of a length of flexible, transparent, elastomeric material forming a band to be placed around the perimeter surface of adjoining pipe flanges of a pipe joint. The each end of the band has a metal strap or buckle for securing the band over and around the flanges to be protected. In the preferred embodiment, the transparent band is clear enough to allow an installer or an inspector to see the outer surfaces of the opposing flanges forming the pipe joint as well as the amount of lubricant or corrosion inhibitor that may have been injected into the flange protector.

Another aspect of the present invention is to provide a flange protector having a resilient, transparent, elastomer seal for sealing the outer surface of opposing pipeline flanges that is configured to eliminate the need for a metal band completely around the circumference of the flange to be sealed.

Another aspect of the invention is to provide a transparent band for sealing a flange that works in cooperation with fittings means for injecting a lubricant or corrosion inhibitor into the pipe flange protector for impeding or prohibiting the formation of corrosion on the pipe flange.

These and other aspects and advantages of the present invention are described in or apparent from the following detailed description of preferred embodiments.

DESCRIPTION OF THE PREFERRED EMBODIMENTS

Figure 1:
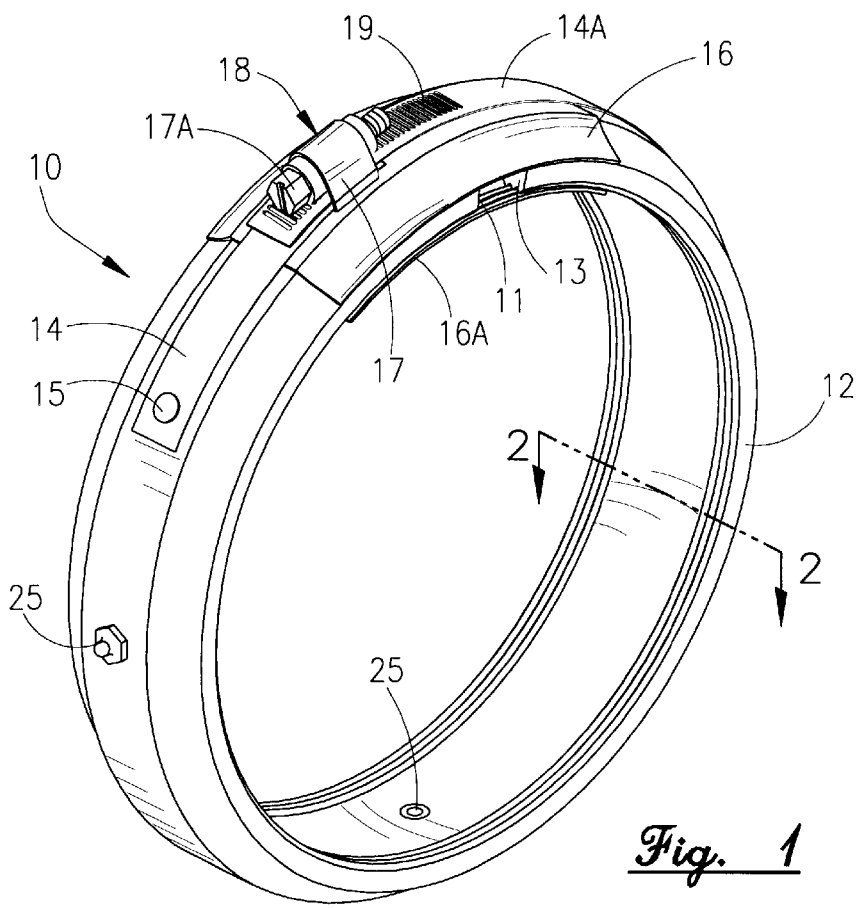
FIG. 1 is a perspective view of the flange protector of the present design.

FIG. 1 shows a flange protector 10 for protecting flanges used in making connections to pipes, valves and the like. The flange protector 10 is comprised of a length of flexible, transparent, elastomeric material having a first end 11 and a second end 13 that form a transparent band 12. The first end 11 has upper and lower flaps 16 and 16A formed of the same flexible, transparent, elastomeric material as the band 12. The flaps 16 and 16A of the first band end 11 are intended to overlap the second band end 13 when the band 12 is wrapped around the circumference of a flange. It is thought that 80 A durometer +/−5 clear PVC will be suitable for use as the transparent material of band 12 and flaps 16 and 16A.

At the first end 11 of the band 12 is a first metal strip 14 attached to the band 12 by a stud 15. Similarly, at the second end 13 of the band 12 is a second metal strip 14A attached to the band 12 by stud 15. The strips 14 and 14A, in conjunction with fastening or buckling means 18, allow the ends 11 and 13 of the band 12 to be pulled together around the perimeter surface of opposing pipe flanges 40 of a pipe joint for protecting and sealing the opposing flanges from weather.

In the preferred embodiment the buckling means 18 is comprised of a fastener 17 mounted to strip 14. The fastener 17 has a screwably engagable tightening means 17A intended to engage with a plurality of rectangular perforations 19 formed in strip 14A. The engagement of the perforations 19 of strip 14A with the screwably engagable tightening means 17A pull the ends 11 and 13 of band 12 together.

The band 12 has a plurality of lubricator fittings 25 that penetrate the band 12. In the preferred embodiment the fittings 25 are screwably attached to the band 12 threads cut into the fittings and the band 12. Though other similarly conventional means for securing the fittings may be utilized. The fittings 25 allow for the injection of lubricants or corrosion inhibitors to be injected into the flange protector for disbursement around the surface area of the opposing flanges 40 of the pipe joint.

Figure 2:
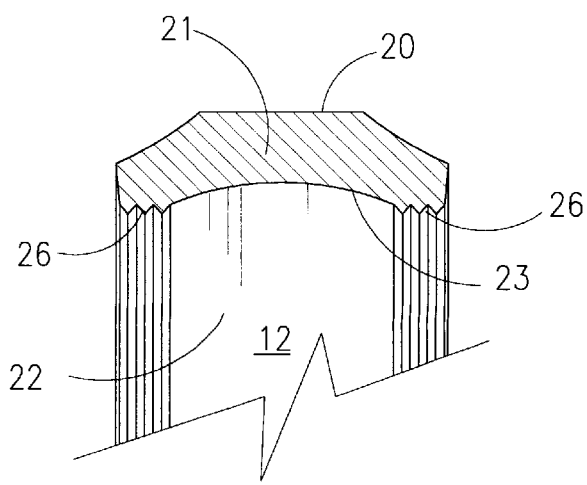
FIG. 2 is a cross-sectional view along section 2—2 of the band shown in FIG. 1.

FIG. 2 shows a cross-sectional view of the flange protector 10 cut through the length of transparent, flexible, elastomeric material forming band 12. As can be seen, the outer surface 20 of the band 12 has a thickened central area 21 to increase the cross-sectional area of the band 12. This thickened cross-sectional area 21 increases the tensile strength of the band 12 and allows the band to be pulled tightly around the periphery of opposing pipe flanges. The inner surface 22 of the band 12, the surface in contact with the flange surface, has a smooth central area 23 bordered by a plurality of longitudinal ridges 26 running along each edge of the band 12. The ridges serve to hold the band 12 on the flange surface when the ends 11 and 13 of the band 12 are pulled together around the periphery of the opposing flanges of the pipe joint to be protected.

Figure 3:
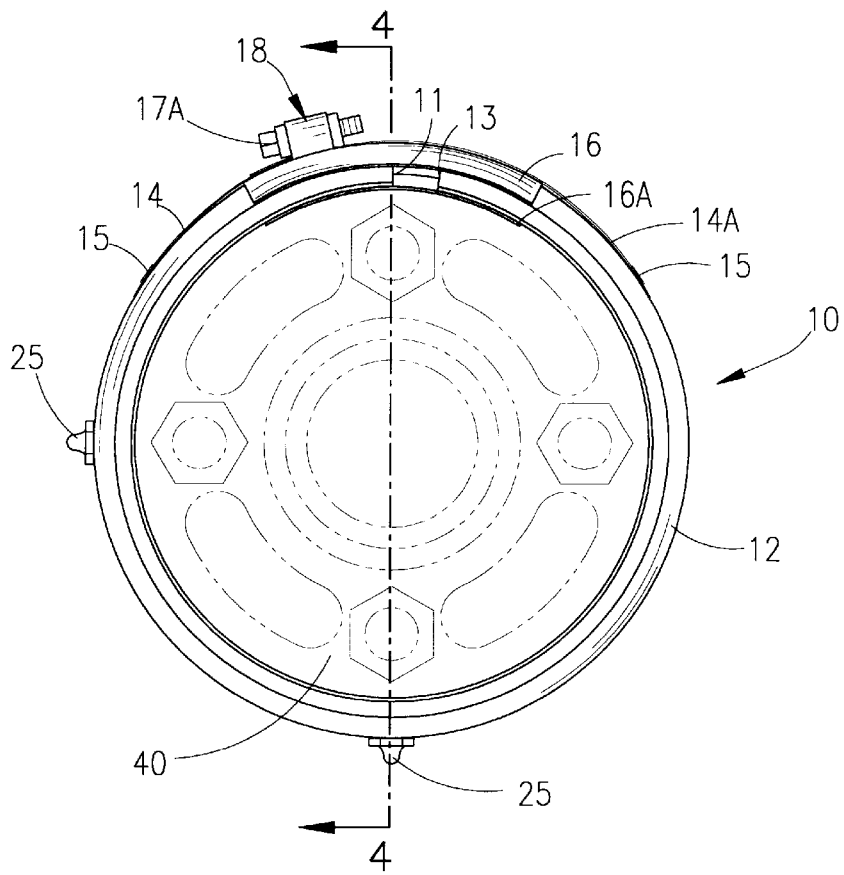
FIG. 3 is a side view of the flange protector of the present design mounted over a pair of opposing pipe flanges.

FIG. 3 shows the flange protector 10 in place around a pipeline joint formed from opposing pipe flanges 40 with flaps 16 and 16A extending over the band end 13. The pipe flanges 40 and corresponding structure are shown in broken lines. The flange protector 10 is held in place by means of the metal strips 14 and 14A in conjunction with the fastener 17. Lubrication inserts 25 allow for the injection of lubricants and corrosion inhibitors to the surfaces of the flanges 40. The transparent band 12 allows an observer to view the amount and condition of the lubricant or corrosion inhibitor and of the flange surfaces without removal of the flange protector.

Figure 4:
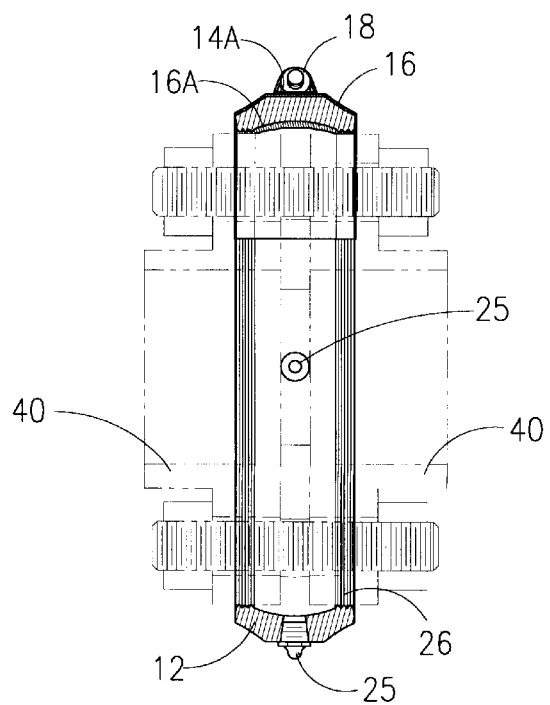
FIG. 4 is a cross-sectional view along Section 4—4 of the mounted flange protector of FIG. 3.

FIG. 4 shows more clearly the relationship between flange protector 12 and the opposing flanges 40. The lubrication insert allows for injection of a desired material directly to the abutting flanges 40. The overlapping flaps 16 and 16A provide for a continuity of flange surface protection over the ends 11 and 13 of the band 12.

The invention has been described with reference to its preferred embodiments, which are intended to be illustrative but not limiting. For example, the invention has been described with reference to conventional flanged pipes, but other pipe shapes are possible that would require corresponding flange protector shapes. Thus, variations and changes may be made without departing from the spirit and scope of the invention as defined in the following claims.

I claim:

1. A pipe flange protector comprising:
   (a) a band comprised of a length of transparent, flexible, elastomeric material having first and second ends and inner and outer surfaces, said length elastomeric being sufficient;
   (b) means for fastening said first and second ends of said band together around the periphery of opposing flanges of a pipe joint; and
   (c) means for injecting a lubricant through said band.

2. The flange protector of claim 1, wherein said first end of said band has an inner transparent elastomeric flap and an outer transparent elastomeric flap, said inner flap and said outer flap extending away from said first end of said band and thereby overlapping said second end of said band when said band is wrapped around said periphery of said opposing flanges of said pipe joint.

3. The flange protector of claim 1, wherein said means for fastening said first and second ends of said band together includes a first metal strap fastened to said first end of said band and a second metal strap fastened to said second end of said band, said first and second metal strips extending outward from the respective ends of said band.

4. The flange protector of claim 3, wherein said means for fastening said first and second ends of said band together includes an attachment means mounted on said first metal strap, said attachment means having a screw means for screwably engaging said second metal strap and thereby pulling said first and second ends of said band together.

5. The flange protector of claim 4, wherein said second metal strap has a plurality of perforations for engagement with said screw means of said attachment means.

6. The flange protector of claim 5, wherein said first and second metal straps are attached to said band by studs.

7. The flange protector of claim 6, wherein said band is comprised of clear PVC of a durometer of 80 A plus or minus 5.

8. The flange protector of claim 1, wherein said means for injecting lubricants through said band includes a plurality of threaded fittings screwably attached to said band.

9. The flange protector of claim 1, wherein said outer surface of said band has a thickened center segment.

10. The flange protector of claim 9, wherein the said inner surface of said band has a plurality of longitudinal ridges extending along the edges of said band.

11. The flange protector of claim 1, wherein said band is comprised of clear PVC of a durometer of 80 A plus or minus 5.

12. A flange protector for protecting opposing flanges of a flanged pipe joint from corrosion and leakage comprising:
   (a) a band comprised of a length of transparent, flexible, elastomeric material, said band having first and second ends and inner and outer surfaces;
   (b) means for fastening said first and second ends of said band together around the periphery of a pair of opposing pipe flanges of a pipe joint, said fastening means having a first metal strap fastened to said first end of said band and a second metal strap fastened to second end of said band, said first and second metal strips extending outward from said band ends, said second strap having a plurality of perforations spaced equally along its length, an attachment means mounted on said first metal strap, said attachment means having a screw means for screwably engaging said perforations of said second metal strap and thereby pulling said first and second ends of said band together around said periphery of said opposing flanges of said pipe joint;
   (c) an inner transparent elastomeric flap and an outer transparent elastomeric flap, said inner and outer flaps extending outward from said first end of said band so as to allow said inner flap and said outer flap to overlap said second end of said band when said band is wrapped around said pipe opposing flanges; and
   (d) means for injecting material through said band.

13. The flange protector of claim 12, wherein said first and second metal straps are attached to said band by stud means.

14. The flange protector of claim 13, wherein said means for injecting lubricants through said band includes a plurality of threaded fittings screwably attached to said band.

15. The flange protector of claim 14, wherein the outer surface of said band has thickened center segment.

16. The flange protector of claim 15, wherein said inner surface of said band has a plurality of longitudinal ridges extending along its edges.

17. The flange protector of claim 12, wherein said band is comprised of clear PVC of a durometer of 80 A plus or minus 5.

* * * * *